(12) United States Patent
Van De Wijdeven et al.

(10) Patent No.: US 8,167,698 B2
(45) Date of Patent: May 1, 2012

(54) DETERMINING THE ORIENTATION OF AN OBJECT PLACED ON A SURFACE

(75) Inventors: Sander Bernard Francis Van De Wijdeven, Eindhoven (NL); Anthonie Hendrik Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 452 days.

(21) Appl. No.: 12/439,294

(22) PCT Filed: Sep. 12, 2007

(86) PCT No.: PCT/IB2007/053669
§ 371 (c)(1),
(2), (4) Date: Feb. 27, 2009

(87) PCT Pub. No.: WO2008/032270
PCT Pub. Date: Mar. 20, 2008

(65) Prior Publication Data
US 2010/0066016 A1    Mar. 18, 2010

(30) Foreign Application Priority Data

Sep. 13, 2006   (EP) ..................................... 06120593

(51) Int. Cl.
*A63F 9/24*   (2006.01)
(52) U.S. Cl. .......... 463/14; 463/36; 178/18.01; 345/175
(58) Field of Classification Search ........................ None
See application file for complete search history.

(56) References Cited

U.S. PATENT DOCUMENTS

| 5,082,286 | A | * | 1/1992 | Ryan et al. ..................... 273/238 |
| 5,121,926 | A | | 6/1992 | Pfaender |
| 5,818,424 | A | * | 10/1998 | Korth ............................. 345/158 |
| 6,498,602 | B1 | * | 12/2002 | Ogawa .......................... 345/173 |
| 6,670,952 | B2 | * | 12/2003 | Jaeger et al. .................. 345/179 |
| 6,761,634 | B1 | | 7/2004 | Peterson et al. |
| 7,576,725 | B2 | * | 8/2009 | Bathiche et al. ............. 345/156 |
| 2002/0075243 | A1 | | 6/2002 | Newton |
| 2003/0156100 | A1 | | 8/2003 | Gettemy |
| 2006/0001645 | A1 | | 1/2006 | Drucker et al. |

FOREIGN PATENT DOCUMENTS

| EP | 0716389 A1 | 6/1996 |
| FR | 2587905 | 4/1987 |
| GB | 2133537 A | 7/1984 |
| WO | 9713563 A1 | 4/1997 |
| WO | 2006033036 A2 | 3/2006 |
| WO | 2006033037 A1 | 3/2006 |
| WO | 2006095320 A2 | 9/2006 |

* cited by examiner

*Primary Examiner* — Evan Pert
*Assistant Examiner* — Andres Munoz (57) ABSTRACT

A touch screen includes light emitters and light detectors arranged around a periphery thereof. The position, orientation, shape and/or size of objects may be determined by switching the light emitters on one-by-one and detecting shadows caused by the objects. The objects include at least a first part with optical properties of a first type and a second part with optical properties of a second different type. By determining the optical phenomena caused by the second part, the orientation of the objects may be determined and/or the objects may be recognized or identified.

9 Claims, 9 Drawing Sheets

DETERMINING THE ORIENTATION OF AN OBJECT PLACED ON A SURFACE

BACKGROUND OF THE INVENTION

1. Technical Field

The present invention relates to a system, such as a touch screen system, using light for determining properties of an object placed on a surface.

The present invention also relates to an apparatus, object and a method for use in such a system.

2. Description of Related Art

With current infrared touch screens it is not possible to detect more than one position at a time, because they use a method that scans a grid built up by LEDs and light sensors. A position is selected in the grid by interrupting a light beam in horizontal and vertical direction. The detection of multiple points is not possible for all positions, because the selection of one point can block the correct detection of other points. Therefore, this technique is less usable for multi point detection. Furthermore, shapes cannot be detected with the current technique; only some form of 'bounding' box can in principle be detected in the grid of LEDs and sensors.

In order to overcome these problems the co-pending provisional application with U.S. Ser. No. 60/660,366 filed on 10 Mar. 2005 for Sander B. F. van de Wijdeven and Tatiana A. Lashina for SYSTEM AND METHOD FOR DETECTING THE LOCATION, SIZE AND SHAPE OF MULTIPLE OBJECTS THAT INTERACT WITH A TOUCH SCREEN DISPLAY, which had not been published at the time of filing of the present application, proposes a system with on the border of the screen a number of light emitters (e.g. infrared LEDs) and a number of light sensors. The lights of the screen are initially turned off and then the lights are turned on one by one. The light (lamp or LED) shines a beam of light, which is detected by the sensors on opposite sides of the screen. When there is an object in between the light and the opposite side of the screen this object casts a shadow. This shadow is detected by the sensors by the absence of light. The combination of knowledge about what light is turned on and what sensors detect or do not detect the light (compared to the calibration state) allows the calculation of an area in which the object must be. If a complete cycle is made in which all the light emitters are turned on, the position, shape and size of the object may be determined.

SUMMARY OF THE INVENTION

According to an aspect of the invention, a system comprising a plurality of light emitters and light detectors arranged around a periphery of a surface is provided. The system comprises at least an object to be placed on said surface. The object comprises at least a first part with optical properties of a first type and a second part with optical properties of a second type different from the first type for the light used by the light emitters. The system is equipped to determine the orientation of the object and/or recognize and/or identify the object by using detected light phenomena caused by the second part of the object.

The system may be a touch screen with or without a display in particular for board games but it may also be a graphic input tablet or any other system in which it is useful to detect properties of objects placed on a surface.

The system according to the invention is particularly useful for determining the orientation of objects, having a shape which is (point) symmetrical, like circles, ellipses, triangles, squares and rectangles. These are by far the most occurring objects used for interaction with a touch screen. Adding the possibility of object orientation detection to shape detection enriches the input for the system even more, so more complex actions from the user can be detected/interpreted. In some board games such as Stratego, the orientation of the objects is important. Only one player is allowed to see an image which is at only one side of the pawn and by detecting its orientation, a warning signal can be provided when the orientation of the pawn is such that the other player might also see the image. Accurate knowledge of the orientation of an object can be also of great importance for other specific applications, like strategic games where soldiers or tanks firing at other positions. Another example is active moving pawns that indicate a timer.

The system according to the invention can also be used with non-symmetrical objects. The shape of such an object is of course detected including its orientation, but this orientation is rather coarse and for some applications more accurate orientation detection is required.

The system according to the invention furthermore allows the recognition or identification of an object without changing its appearance. This avoids that differently shaped objects for identification have to be used. Such different shapes are generally not preferred, because designers who create objects want to have uniformly shaped objects for aesthetical reasons or production costs. Also in order to differentiate a number of different shapes, it would be necessary to select some shapes which are mechanical unstable and fall over easily.

According to further aspects of the invention an apparatus, objects and a method are provided.

WO 2006/033036 discloses a game board with a board surface. It comprises light modulating cells and light sensors arranged in a grid, below the board surface. A pawn for use in the game board comprises a code on its contact surface with the board, i.e. the bottom. The pawn may be identified and its orientation may be determined by detecting reflected light from the pawn code. So, the system disclosed in this document does not comprise light emitters and detectors, placed around the periphery of the surface and for this reason does not determine the shape of objects on the surface.

According to a preferred embodiment of the invention, the second part of the object is reflective. The system is equipped to determine the orientation of the object by using detected light reflections caused by the second part of the object.

Preferably, the second part comprises at least a reflective mark on the side of the object when the object is placed on the surface. In this way, no large adaptations are needed to the object but at the same time a reliable orientation determination is enabled.

In case that the second part comprises a plurality of reflective marks besides orientation detection also the identification of the object is rendered possible. The use of more reflective marks on the object can also create a 'barcode' like effect, to indicate the orientation and the unique pattern created by the reflective marks can be used for accurate identification.

According to a further embodiment the first part of the object is opaque and the second part of the object is transparent and the system is equipped to determine the orientation of the object by using detected light passing through the second part of the object.

Preferably, the second part of the object is a passage or a hole passing light only in a certain direction and the system is equipped to determine the orientation of the object by using detected light passing through the passage or the hole in a shadow caused by the first part. A passage or a hole passes light only in a certain direction and therefore this embodiment allows a very accurate orientation detection, which is useful for specific applications, such as games that need a particular skill.

According to an alternative embodiment, the first part of the object is on the outside and is transparent and the second part is on the inside and is opaque. The system is equipped to recognize and/or identify the object by detecting the shape of the second part. The transparent outside of the object does not alter the light that is emitted by the system. In this way the outer shape of the objects used in the system can be identical while the inside can be altered across different objects to allow recognition and/or identification of the object.

Preferably, the first part of the object is transparent for the light used by the light emitters of the system but is opaque for visual light. The type light of light used by the system is usually invisible infrared. Therefore the surrounding material can be opaque for humans while being transparent for the system. In this way, the inside part of the object is made invisible for users and the outside appearance of the objects may be identical. This allows a 'secret key' to be embedded in the object. The use of secret keys can be used for identification of a person to the system, where a person is required to place his or her key on the table before using the system. This can be used to identify a (returning) player in a game or allow other types of access to a computer.

This type of identification can also be used in a game where different objects have different keys identifying them to the system. In the game each type of object has different capabilities or options, e.g. similar to War Hammer 40 k, etc. If a user would like to have different options/capabilities to play with he can purchase new game objects to play with. These new objects will be identified by the system, enabling the new options for the user to play with. The objects will be detected automatically by the system and are difficult to duplicate by the user, because the internal optics are difficult to duplicate.

In a further embodiment the second part of the object is a lens or a prism and the optical phenomena caused thereby, such as reflection and refraction are used for the recognition and/or identification of the object. This provides an alternative way of allowing the object to be recognized or identified.

According to a still further embodiment, the section touching the surface, when the object is placed on the surface, comprises the first and the second part used for orientation detection and/or identification of the object. The object comprises a remaining section placed on top of the section touching the surface. In this way, there is more freedom for designing the outside appearance of the object.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawing, in conjunction with the accompanying specification, in which.

Throughout the figures like reference numerals refer to like elements.

DETAILED DESCRIPTION OF THE PRESENT INVENTION

Although the following detailed description contains many specifics for the purpose of illustration, one of ordinary skill in the art will appreciate that many variations and alterations to the following description are within the scope of the invention.

Accordingly, the following preferred embodiment of the invention is set forth without any loss of generality to, and without imposing limitations upon, the claimed invention.

Although the invention is described and illustrated herein in conjunction with a touch screen (i.e., a display with embedded touch sensing technology) the invention does not require the use of a display screen. Furthermore, the invention may also be used for a graphic input tablet or any other system in which it is useful to detect the position, place and properties of objects placed on a surface, such as a table or a wall.

It should also be appreciated that the invention is not restricted to using infrared light transmitters only. Any kind of light source, visible or invisible, can be used in combination with appropriate detectors.

Figure 1:
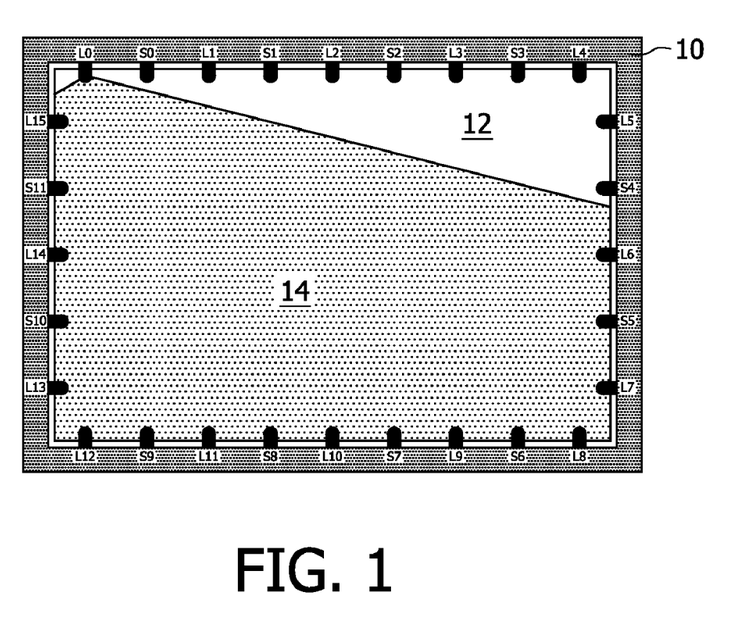
FIG. 1 illustrates a snapshot of a touch screen display during a point in time at which a first light source is switched on during a calibration mode.

FIG. 1 illustrates an infrared optical touch screen display 10. The touch screen display 10 includes a surface 12 for positioning objects and on its periphery, N light transmitters, $L_0$-$L_{15}$, where N=16, which may be embodied as lamps, LEDs or the like, and M sensors (i.e., light detectors) $S_0$-$S_{11}$, where M=12. The light transmitters and sensors being arranged in an alternating pattern (e.g., $L_0$, $S_0$, $L_1$, $S_1$, ... $L_{15}$, $S_{11}$). It should be appreciated that the number and configuration of light transmitters and sensors may vary.

By way of example, a method for detecting the position, shape and size of objects is now described, according to the infrared optical touch screen display apparatus illustrated in FIG. 1.

The method to be described is generally comprised of two stages, a calibration stage and an operational stage.

Calibration is performed to collect calibration data. Calibration data is comprised of sensor identification information corresponding to those sensors which detect a light beam transmitted from each of the respective light transmitters located on the periphery of the touch screen display 10 during a turn-on time of each light transmitter. The turn-on time is defined herein as the time during which light emanates from a respective light transmitter in a switched on state. It should be appreciated that in order to obtain meaningful calibration data, it is required that no objects (e.g., fingers, stylus, etc.) interact with the transmission of the light beams during their respective turn-on times in the calibration mode.

During the calibration stage, as each light transmitter is switched on during its respective turn-on time, the light beam that is cast may be detected by certain of the sensors $S_0$-$S_{11}$ located on the periphery of the touch screen display 10 and may not be detected by certain other sensors. For each light transmitter, $L_0$-$L_{15}$, the identification of the sensors $S_0$-$S_{11}$ that detect the respective light transmitter's light beam is recorded as calibration data. Thereto the touch screen display 10 is provided with a memory (not shown in the figures). FIG. 1 shows the first light source $L_0$ switched on during the calibration mode. It emits a beam of light 14 having a two dimensional spatial distribution that defines a lit area in a plane of the touch screen. The light beam 14 is detected by sensors $S_5$, $S_6$, ... $S_{10}$, $S_{11}$. This information is recorded as calibration data.

After recording the calibration data for light source $L_0$, it is switched off at the end of its turn-on time and the next light source in the sequence, the light source $L_1$, is switched on for its respective turn-on time.

Figure 4:
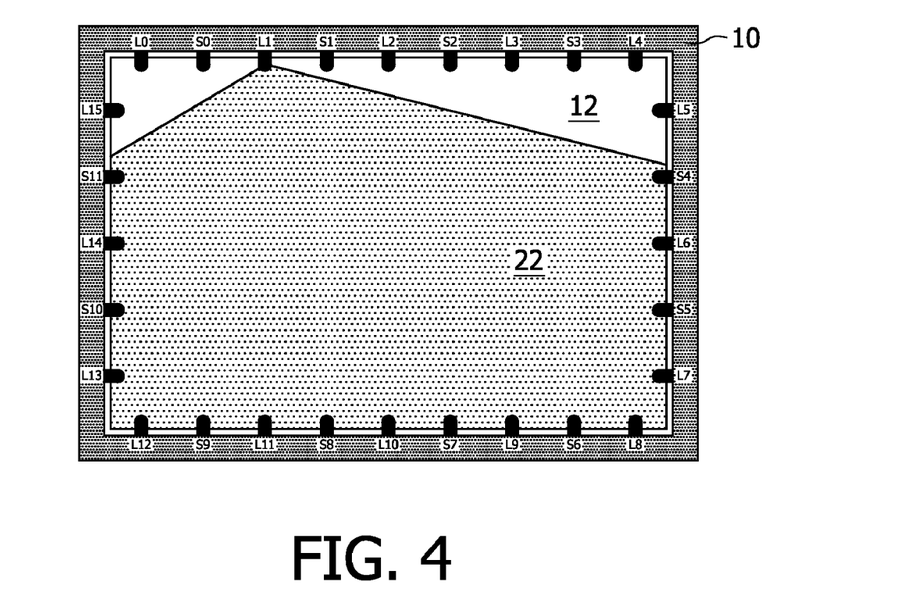
FIG. 4 illustrates a snapshot of a touch screen display during a point in time at which a second light source is switched on during a calibration mode.

FIG. 4 is an illustration of a snapshot of the touch screen display 10 during a point in time at which the next light source $L_1$ in the sequence is switched on during calibration. As shown in FIG. 4, the light source $L_1$ shines a distinctive beam of light 22 having a distinctive coverage pattern in the plane of interest based on its position in the periphery of the touch screen display 10. The light beam 22 is detected by sensors $S_4$, $S_5$, ... $S_{10}$, $S_{11}$. This information is recorded as calibration data.

After recording the sensor information from the light transmitters $L_0$ and $L_1$ in the manner described above, the calibration process continues in a similar manner for each of the remaining light transmitters located in the periphery of the touch screen, namely, the light transmitters $L_2$-$L_{15}$.

After calibration is complete, the touch screen display 10 is ready for use to detect the position, shape and size of one or more objects interacting with the touch screen display 10.

Similar to that described above for calibration, a single cycle of operation in the operational stage starts with the light source $L_0$ being turned on for a pre-determined turn-on time. After $L_0$ turns off, light source $L_1$ is turned on for a pre-determined turn-on time. This process continues in a similar manner for each light transmitter and ends with light transmitter $L_{15}$, the last light transmitter in the sequence. Other sequences of firing leds are also possible.

Figure 2:
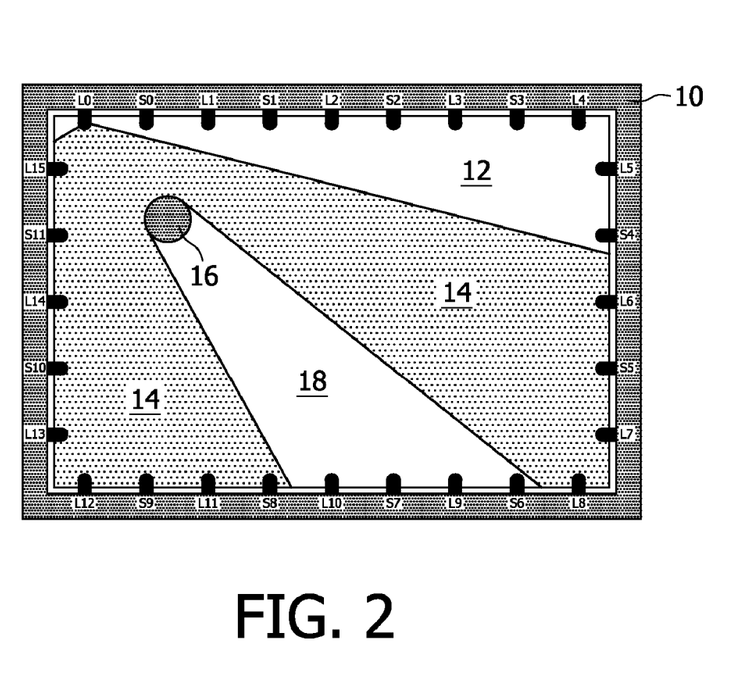
FIG. 2 illustrates a snapshot of the touch screen display during a point in time at which the first light source is switched on during an operational mode.

FIG. 2 illustrates a snapshot of the touch screen display during a point in time at which the first light source $L_0$ is switched on during the operational mode in the presence of a circular object 16. It can be appreciated that the light beam 14 of the first light source is interrupted by the object 16 and the object 16 causes a shadow 18. This shadow is detected by sensors $S_6$ and $S_7$ by the absence of light.

Figure 3:
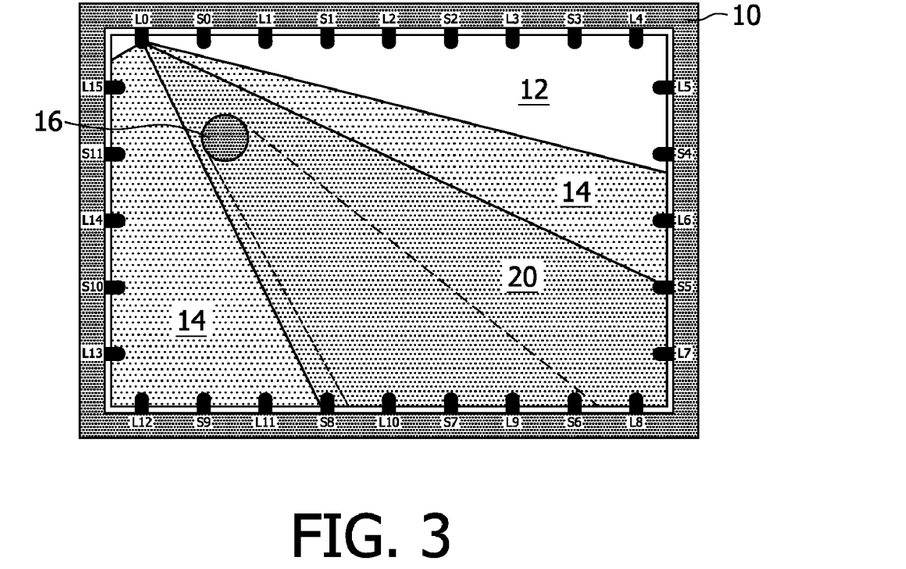
FIG. 3 illustrates how maximum area estimates are being made using the calibration and non-calibration data related to the first light source.

FIG. 3 illustrates how a maximum area estimate is being made using the calibration and non-calibration data related to the first light source. To compute a maximum area estimate, the previously collected calibration data and non-calibration data is used to assist in the computation.

Recall that the calibration data for light transmitter $L_0$ was found to be the range of illuminated sensors ($S_5$-$S_{11}$). This sensor range constitutes those sensors capable of detecting a presence of light from the light transmitter $L_0$ during calibration.

Recall that the non-calibration data for light transmitter $L_0$ in the presence of the circular object 16 was found to be the sensor ranges $S_6$-$S_7$ detecting an absence of light.

Next, a comparison is made of the calibration data and non-calibration data. Specifically, knowing that sensors $S_6$-$S_7$ detect an absence of light during the non-calibration mode and knowing that sensors $S_5$-$S_{11}$ are illuminated during calibration, the shadow area cast by the object 16 can be determined. This is illustrated now with reference to FIG. 3.

FIG. 3 illustrates that the circular object 16 blocks the light path between the light source $L_0$ and sensor $S_6$ and is also shown to be blocking the light path between the light transmitter $L_0$ and sensor $S_7$. FIG. 3 further illustrates that the object 16 does not block the light paths between the light transmitter $L_0$ and the sensors $S_5$ and $S_8$. This information, derived from the calibration and non-calibration data, is used to determine the minimum and maximum area estimates for the object 16.

The maximum area estimate of object 16, labelled 20, for light transmitter $L_0$ is defined as the area between the points $L_0$, $S_5$, $S_8$ and the lower right hand corner. This area is derived by including the sensors $S_5$ and $S_8$ adjacent to the shadow area detected with the sensors $S_6$-$S_7$.

Based on this information, also a minimum area estimate (not shown in FIG. 3) can be determined as follows. The circular object 16 blocks the light path between the light source Lo and sensors $S_6$ and $S_7$. Therefore, the minimum area estimate of object 16, during the turn-on time of light source Lo is defined by the triangle defined by points $L_0$, $S_7$ and $S_6$.

Figure 5:
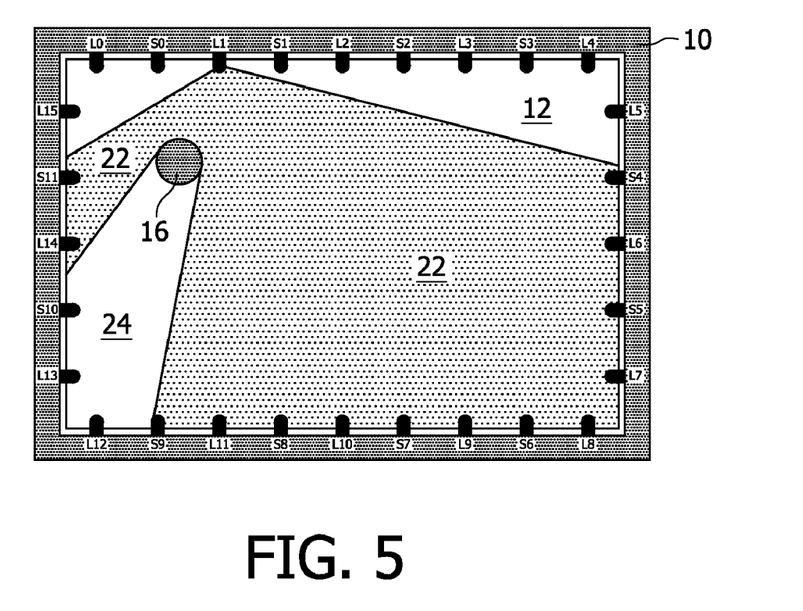
FIG. 5 illustrates a snapshot of the touch screen display during a point in time at which the second light source is switched on during an operational mode.

FIG. 5 illustrates a snapshot of the touch screen display during a point in time at which the second light source $L_1$ is switched on during the operational mode in the presence of a circular object 16. It can be appreciated that the light beam 22 of the first light source is interrupted by the object 16 and the object causes a shadow 24. This shadow is detected by sensor $S_{10}$ by the absence of light.

Figure 6:
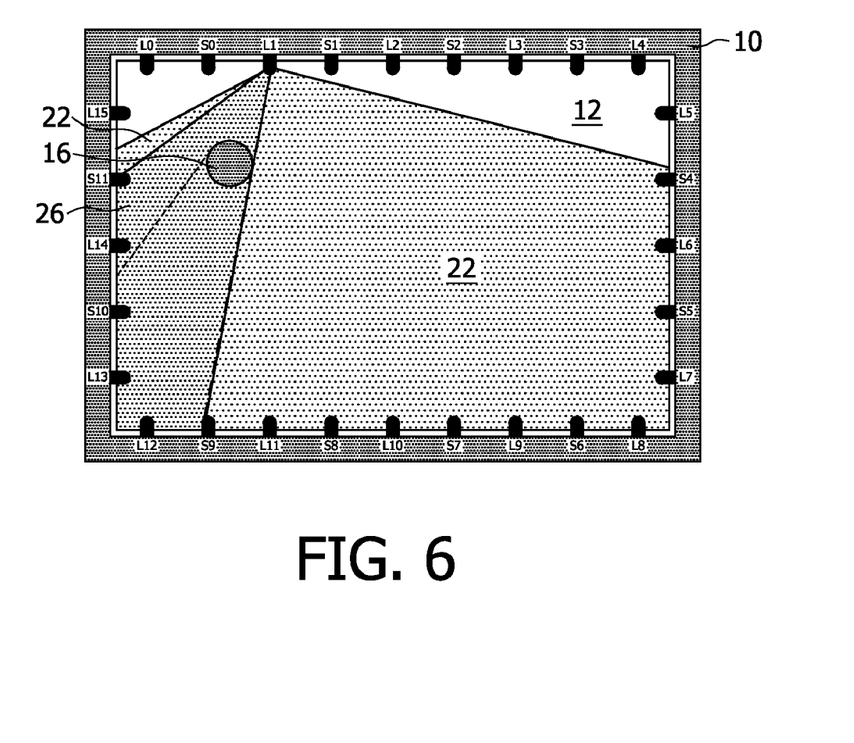
FIG. 6 illustrates how maximum area estimates are being made using the calibration and non-calibration data related to the second light source.

FIG. 6 illustrates the maximum area estimate 26 of object 16 calculated for light transmitter $L_1$. The calculation is made in the same way as illustrated for the first light source $L_0$ with reference to FIG. 3. The maximum area estimate for object 16 for light transmitter $L_1$ is defined as the area between the points $L_1$, $S_9$, $S_{11}$ and the lower left hand corner. This area is derived by including the sensors $S_9$ and $S_{11}$ adjacent to the shadow area detected with the sensors $S_{10}$.

Figure 7:
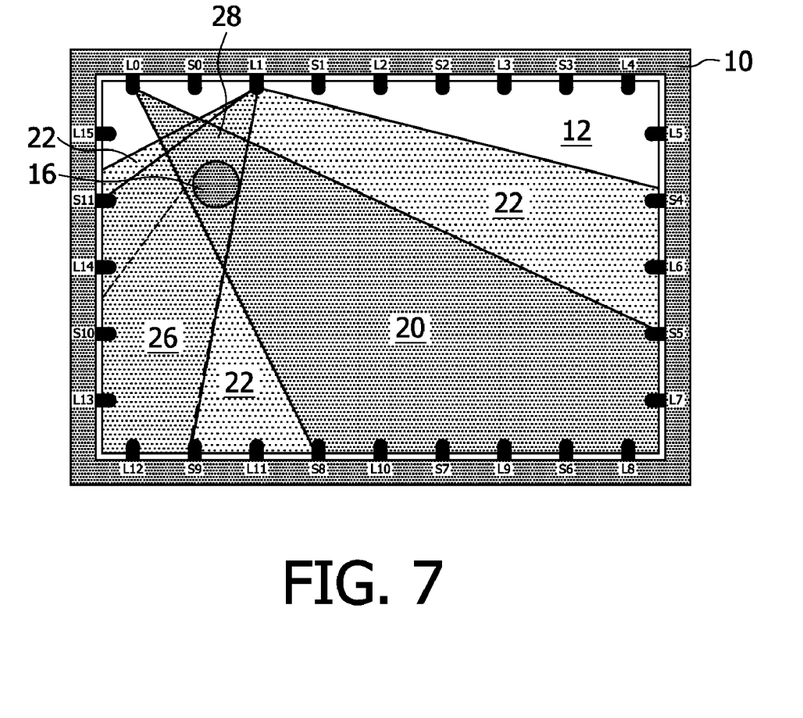
FIG. 7 illustrates how maximum area estimates are combined to determine the total boundary area of an object.

FIG. 7 illustrates the cross section 28 of the two maximum area estimates 20, 26 of light transmitters $L_0$ and $L_1$. By combining these two estimates the estimate of the position of the object 16 becomes more specific. It can be easily appreciated that by adding more maximum area estimates and minimum area estimates, the estimated position of the object becomes ever more accurate.

The minimum and maximum area estimates, once determined, are stored for each light transmitter. The process of determining a minimum and maximum area continues in a similar manner for each of the remaining light transmitters $L_2$-$L_{15}$. After a complete cycle of operation, the stored minimum and maximum area estimates are retrieved from the data repository and combined to determine the position, outer shape and size of the object 16.

The processing and calculations described herein above are performed by suitable processing means of the touch screen display 10 (not shown in the figures).

Because of the finite number of sensors in use and the fixed spacing there between, the accuracy in determining the position, shape and size of an object is subject to uncertainty. The uncertainty may be partially minimized by increasing the number of sensors used in the touch screen display 10. By increasing the number (density) of sensors, the relative spacing between the sensors decreases accordingly which leads to a more accurate calculation of the position, shape and size of an object.

Alternatively or additionally, the number of transmitters may be increased which also leads to a more accurate calculation of the position, shape and size of an object. It is noted that increasing the number of transmitters will highlight the object from additional angles thus providing additional information leading to more accurate results.

The overall measurement accuracy may also be increased by increasing the density of transmitters and/or receivers in certain areas of the screen where detection proves to be less accurate than other areas. This non-even configuration of transmitters and/or receivers can compensate for the less accurate detection.

Figure 8:
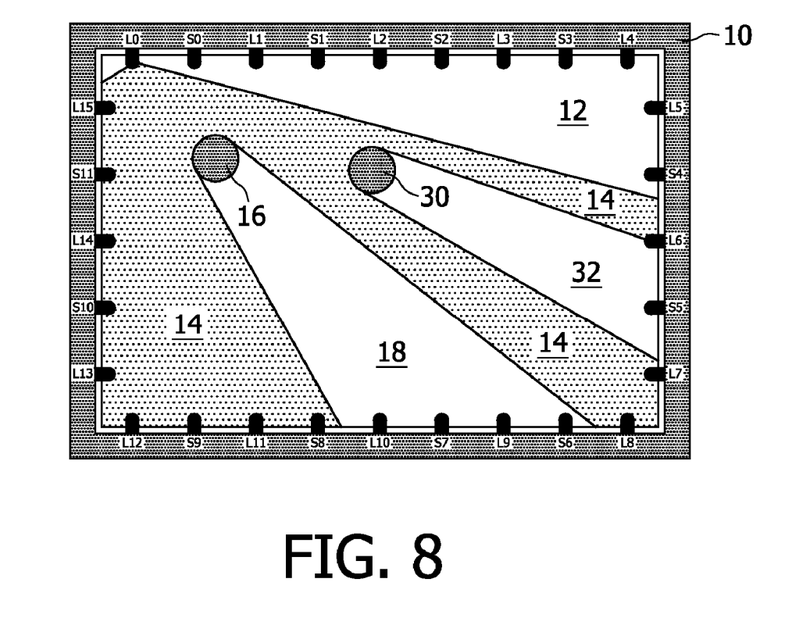
FIG. 8 illustrates a snapshot of the touch screen display in the operational mode during the turn-on time of the first light source in the presence of two circular objects.

As shown in FIG. 8, also detection of more than one object is possible, if the objects are not touching. The mechanism is the same as described above, but then more areas are detected when a round of snapshots is made. FIG. 8 shows the presence of an additional object 30 resulting in an additional shadow area 32 when light source $L_0$ is switched on.

FIGS. 1-8 illustrates cases where 100% of the light that reaches the object's surface gets absorbed by the object. Of course other situations are also possible, for example using objects manufactured of a material partly absorbing and partly reflecting light or objects manufactured of a material partly absorbing and partly transmitting (i.e., pass through) light.

The method for estimating the position, shape and size as described with reference to FIGS. 1-8 is subject of the co-pending application that was referred to earlier, the provisional application with U.S. Ser. No. 60/660,366 filed on 10 Mar. 2005 for Sander B. F. van de Wijdeven and Tatiana A. Lashina for SYSTEM AND METHOD FOR DETECTING THE LOCATION, SIZE AND SHAPE OF MULTIPLE OBJECTS THAT INTERACT WITH A TOUCH SCREEN DISPLAY, which had not been published at the time of filing of the present application.

Figure 9:
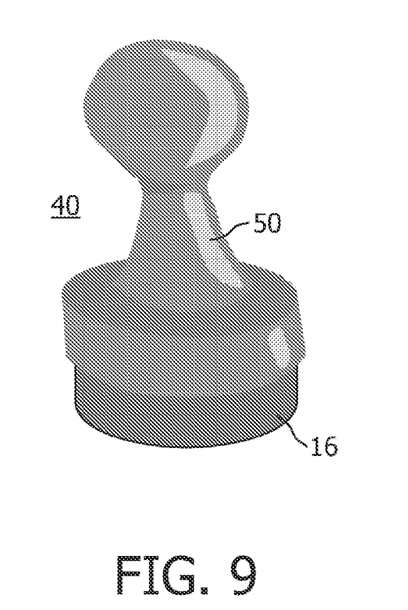
FIG. 9 shows a pawn to be used on the touch screen display.

FIG. 9 shows a pawn 40 to be used on the touch screen display 10. The invention is very useful for systems wherein pawns are used, such as board games, but of course it can also be used with any other object. Also fingers can be seen as objects by applying e.g. a reflective stripe to the finger for orientation detection. The pawn comprises a first section 16 touching the surface, that is used for shape detection and a second section 50 placed on top of the first section 16 touching the surface. In the remaining part of this description the section 16 of the object 40 touching the surface will be referred to as "object", avoiding lengthy terms.

Figure 10:
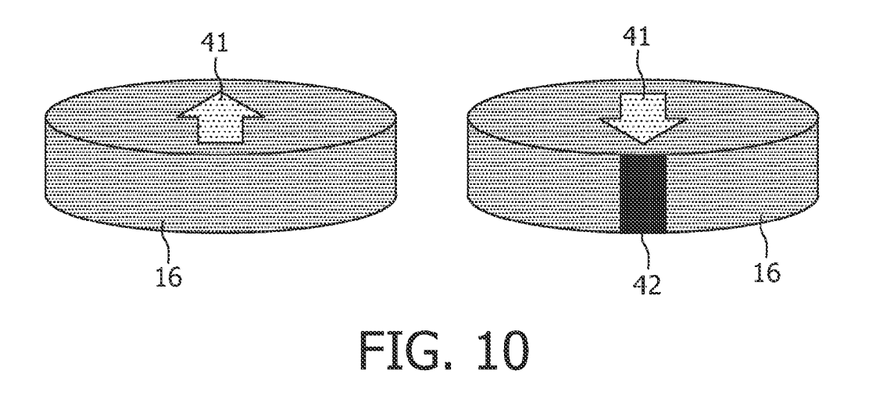
FIG. 10 shows the object used for shape and orientation determination according to a first embodiment of the invention in two positions.

According to a first embodiment of the invention, which is illustrated in FIG. 10, the object comprises a first opaque part and a second reflective part 42, which is added on the side of the object 16. Arrow 41 points in the direction of the reflective part 42. FIG. 10 shows the object 16 in two opposite positions as illustrated by the arrow 41 pointing in opposite directions.

Figure 11:
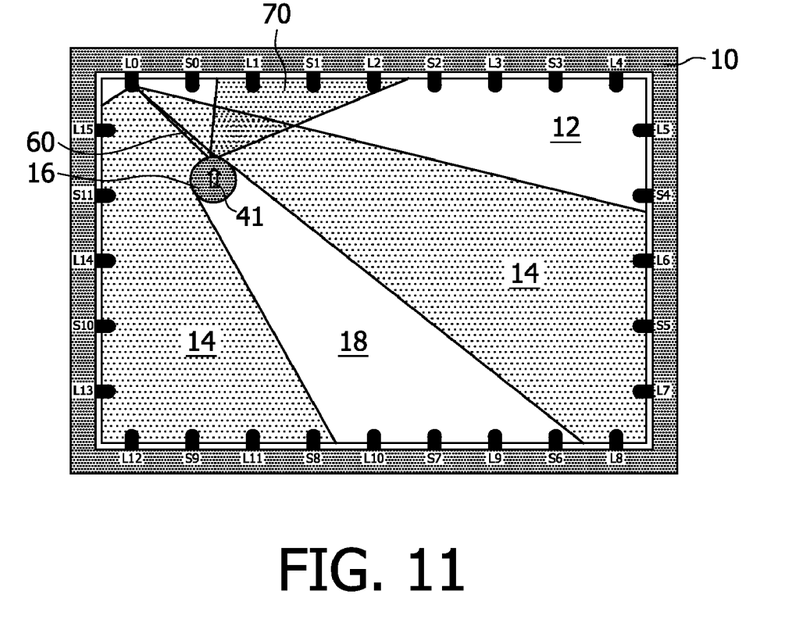
FIG. 11 illustrates a snapshot of the touch screen display during a point in time at which the first light source is switched on during an operational mode, wherein the object according to the first embodiment is oriented in a first way.
Figure 12:
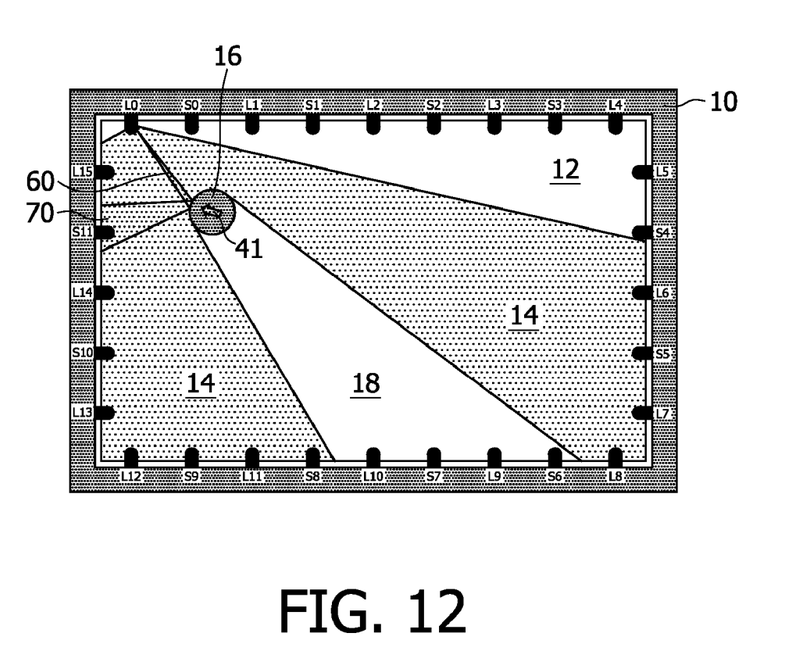
FIG. 12 illustrates a snapshot of the touch screen display during a point in time at which the first light source is switched on during an operational mode, wherein the object according to the first embodiment is oriented in a second way.

As a result of the reflective part 42, which functions as an orientation mark of the symmetrical object, the orientation thereof can be detected as illustrated in FIG. 11. As shown in FIG. 11 when the first light source $L_0$ is switched on, object 16 causes a shadow 18 in the same way as illustrated in FIG. 2. However, it will also cause a reflection 70 of a part 60 of the light beam 40. This way the detected result will contain an indication of the orientation of the object. Here the rotation of the object will determine the angle of the reflected light. The sensor in this direction can detect an increase of light intensity. The reflected light 70 is detected by sensor $S_1$, when the object 16 is in the position as shown in FIG. 11 and by sensor $S_{11}$ when the object 16 is in the position as shown in FIG. 12. The rotation can be determined from all snapshots from $L_0$ to $L_{15}$, to increase accuracy.

Accurate knowledge of the orientation of an object can be great importance for specific applications, like soldiers or tanks firing at other positions. Another example is active moving pawns that indicate a timer.

Reflective parts on the object can also be used to identify the objects. The use of more reflective marks on the object can also create a 'barcode' like effect, to indicate the orientation and the unique pattern created by the reflective marks can be used for accurate identification.

For certain applications it is advantageous to know the orientation of an object very precisely, like the already mentioned shooting 'pawns' or a self orienting timer, or any game that needs particular skill (e.g. set force of golf swing). For this purpose dedicated non-symmetrical objects can be designed.

Figure 13:
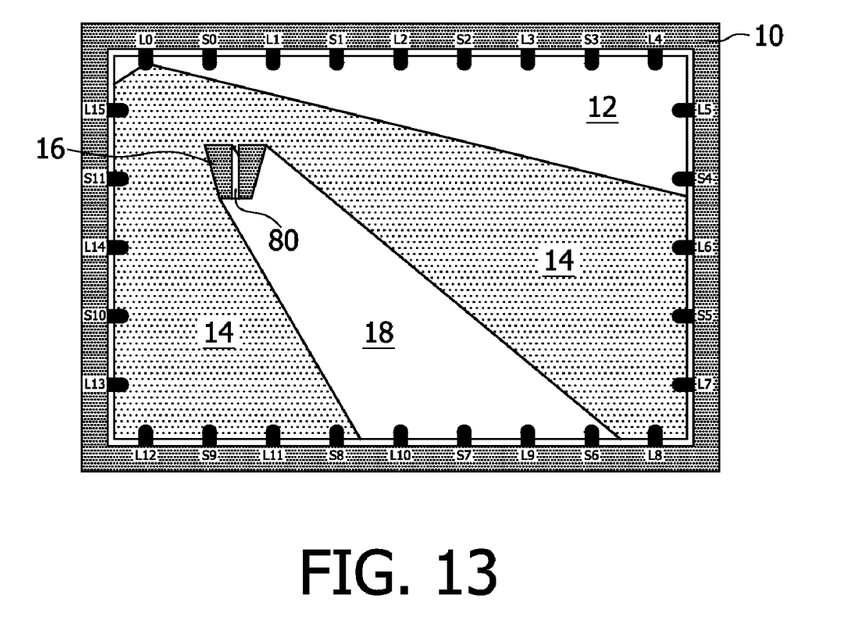
FIG. 13 illustrates a snapshot of the touch screen display during a point in time at which the first light source is switched on during an operational mode, wherein the object according to a second embodiment of the invention is oriented in a first way.
Figure 14:
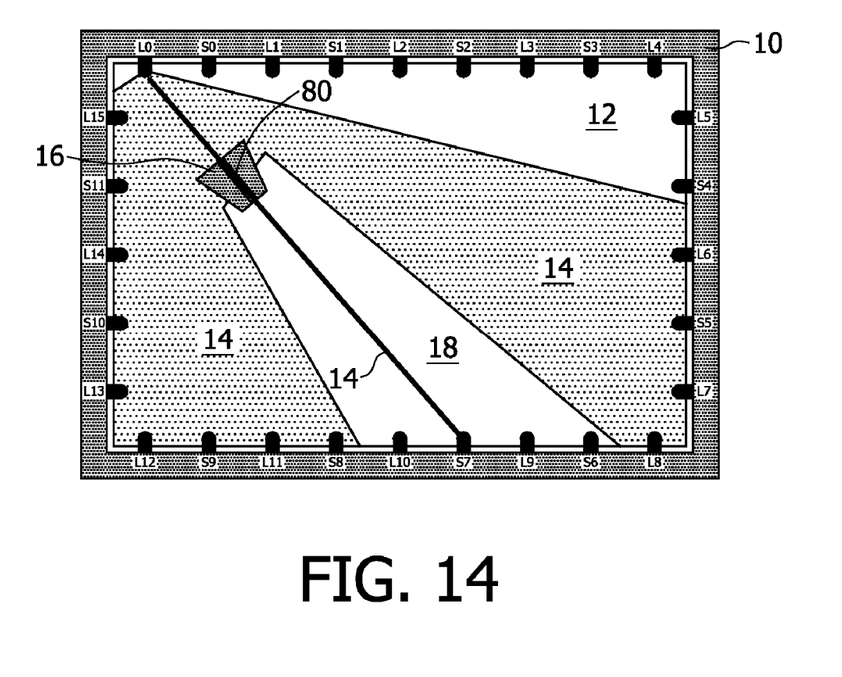
FIG. 14 illustrates a snapshot of the touch screen display during a point in time at which the first light source is switched on during an operational mode, wherein the object according to a second embodiment is oriented in a second way.

Of course non-symmetrical objects are detected including their orientation, but this orientation is rather coarse. According to a second embodiment of the invention, an object 16 is provided with a first opaque part and a second transparent part such as a hole or passage 80 that will pass light only in a certain direction, as shown in FIGS. 13 and 14. Accurate detection of the orientation of this passage is possible.

FIG. 13 illustrates a snapshot of the touch screen display during a point in time at which the first light source $L_0$ is switched on during an operational mode, wherein the object according to a second embodiment of the invention is oriented in a first way. In this orientation, no light of the light beam 14 passes through the passage 80 and a shadow 18 is detected, in the same way as illustrated in FIG. 2. In FIG. 14 the object 16 is oriented in a second way. This orientation gives rise to a detector signal in the middle of the shadow 18, which is detected by sensor $S_7$. It will be appreciated that for each orientation only a single light source gives rise to a signal in the middle of the shadow. To enhance the resolution multiple passages and/or reflective parts such as mirrors can be added. When the system is familiar with this attributes, it can use a matched filter (cross correlation) to determine the angle even more accurate.

Figure 15:
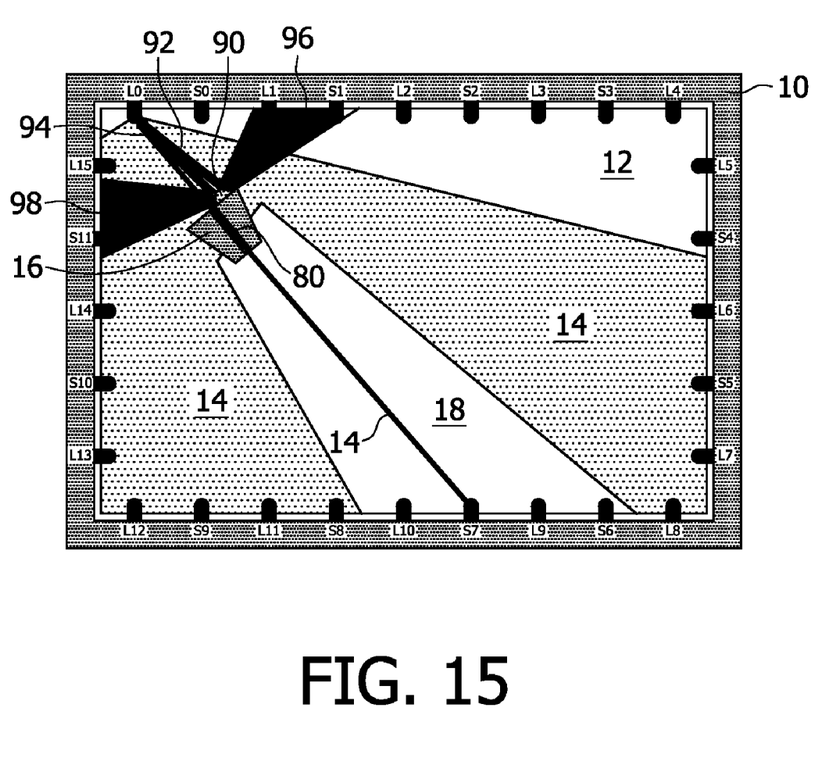
FIG. 15 illustrates a snapshot of the touch screen display during a point in time at which the first light source is switched on during an operational mode, showing the object according to a third embodiment of the invention.

FIG. 15 illustrates a snapshot of the touch screen display during a point in time at which the first light source $L_0$ is switched on during an operational mode, showing the object 16 according to a third embodiment of the invention. Besides the passage 80, the object 16 comprises a mirror 90. This mirror 90 causes a reflection 96 of a first narrow part 92 of the light beam 14 in a first direction, as detected by sensor $S_1$. It causes a reflection 98 of a second narrow part 94 of the light beam 14 in a second direction, as detected by sensor $S_{11}$.

By adding multiple options for orientation detection, more orientation information can be gathered by the system and therefore increase the accuracy of the detection or detect orientation of the object in more occasions, e.g. when other objects on the screen block one of the orientation detection options, e.g. the hole in the object.

Figure 16:
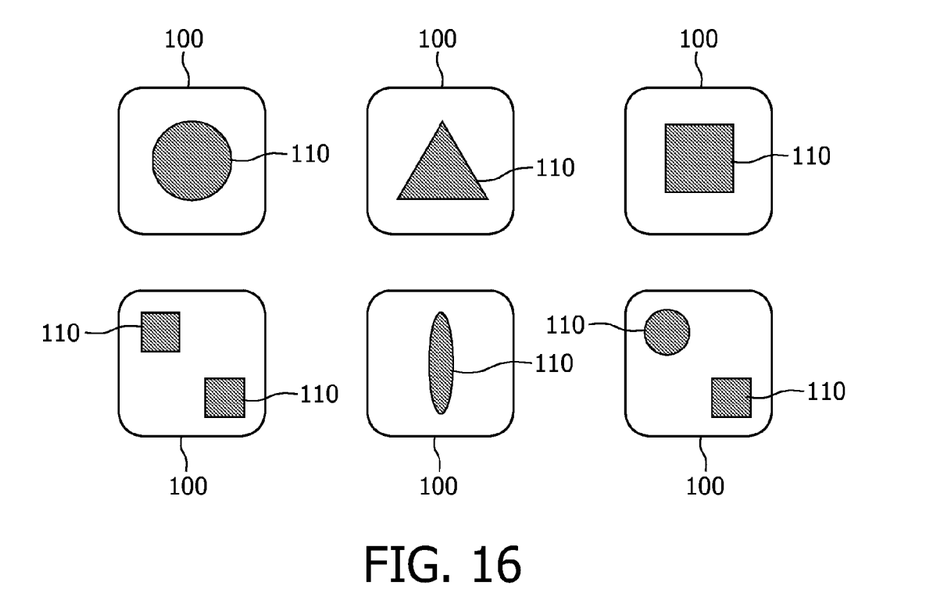
FIG. 16 shows an object used for shape determination and identification according to a fourth embodiment of the invention.
Figure 17:
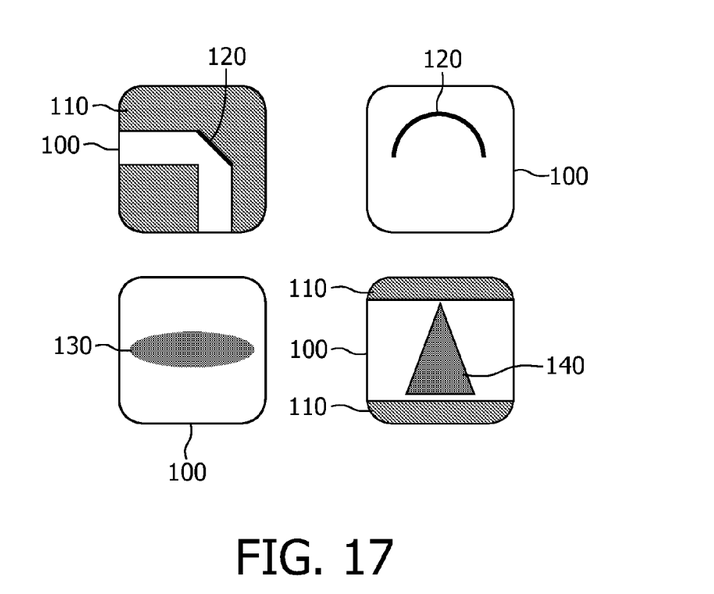
FIG. 17 shows an object used for shape determination and identification according to a fifth embodiment of the invention.

According to a fourth and a fifth embodiment of the invention as shown in FIGS. 16 and 17 objects are provided that are uniformly shaped but still can be distinguished or identified. Thereto, in the fourth embodiment the objects are built using 2 different materials: A first part consisting of transparent material 100 that is used for the outside of the object and a second part of opaque material 110 that is used for the inside as shown in FIG. 16. In this way the outside can be identical while the inside can be altered across different objects. FIG. 16 shows six examples of shapes of the (opaque) inside of the object according to the fourth embodiment but of course any other shape may be used. It is clear from the bottom row of FIG. 16, that the objects including the transparent part 100 are more stable when placed on the surface than objects including only the opaque shapes 110.

The light that is used by the system will not be hindered by the transparent outside, so the shape of the opaque part can be detected in the way as described with reference to FIGS. 1-8.

Separating the outside and inside parts of the object also allows the inside object to be altered more easily, e.g. a player in a checkers game can indicate a 'king' by changing the shape of the internal object, so the system can distinguish this piece from the ordinary checkers pieces.

The transparent material can be glass or plastic, but does not have to be transparent for visible light. Preferably, the type of light used by the system is (invisible) infrared. Therefore the surrounding material can be opaque for humans while being transparent for the system. This allows a 'secret key' to be embedded in the object. This key can be based on the object detection mechanism mentioned above with reference to FIG. 16.

In an alternative fifth embodiment as shown in FIG. 17 this key is built with internal components such as a mirror 120, a lens 130 or a prism 140. So, according to this embodiment not only shape detection is used, to create a unique pattern of detected light by the object that allows the object to be recognized or identified but also reflection, refraction and other optical phenomena are used for this purpose. FIG. 17 shows four examples of the object according to the fifth embodiment but it will be clear to the skilled person that there are many other possibilities.

The use of 'secret' keys can be used for identification of a person to the system, where a person is required to place his or her key on the table before using the system. This can be used to identify a (returning) player in a game or allow other types of access to a computer.

This type of identification can also be used in a game where different objects (pawns) have different keys identifying them to the system. In the game each type of object has different capabilities or options, (e.g. similar to War Hammer 40 k, etc.) If a user would like to have different options/capabilities to play with s/he can purchase new game objects (pawns) to play with. These new objects will be identified by the system, enabling the new options for the user to play with.

The objects will be detected automatically by the system and are difficult to duplicate by the user, because the internal optics are difficult to duplicate. This will make sure the player has to purchase the new objects, which allows for a business similar to that of War Hammer 40K.

The embodiments disclosed in FIGS. 10-17 have been described for opaque material absorbing 100% of the light. However, "opaque" in the light of the invention also includes materials partly absorbing and partly reflecting light or materials partly absorbing and partly transmitting (i.e., pass through) light.

Although this invention has been described with reference to particular embodiments, it will be appreciated that many variations will be resorted to without departing from the scope of this invention as set forth in the appended claims.

The specification and drawings are accordingly to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g. computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

The invention claimed is:
1. A system comprising:
a surface for placement of an object, wherein the surface has a periphery;
for providing light; and
light detectors, wherein the light emitters and the light detectors are arranged around the periphery of the surface, wherein the object comprises at least a first part with optical properties of a first type and a second part with optical properties of a second type different from the first type for the light provided by the light emitters; and
a processor configured to determine a first orientation and a position of the object on the surface from reflected light reflected by the second part of the object in a first direction and detected by a first set of the light detectors in response to being illuminated by a first light emitter of the light emitters when the object is in the first orientation and the position,
the processor being further configured to determine a second orientation of the object located at the position from reflected light reflected by the second part of the object in a second direction and detected by a second set of the light detectors in response to being illuminated by the first light emitter when the object is in the second orientation and the position.

2. The system according to claim 1, wherein the second part is located at a portion of the object for reflecting light in different directions depending on orientation of the object.

3. The system according to claim 2, wherein the second part comprises a reflective mark on a side of the object, wherein the reflective mark completely covers a portion of the side from a lower part of the object contacting the surface to an upper part of the object opposite the lower part, and wherein remaining portions of the side from the lower part to the upper part are of the first part with optical properties of the first type.

4. The system according to claim 3, wherein the second part comprises a plurality of reflective marks, the plurality of reflective marks being separated by the first part so that only portions of the side of the object are reflective.

5. The system of claim 1, wherein the object is a pawn.

6. A system comprising:
 a surface for placement of an object, wherein the surface has a periphery;
 light emitters for providing light; and
 light detectors, wherein the light emitters and the light detectors are arranged around the periphery of the surface, wherein the object comprises an opaque part and a transparent part for the light provided by the light emitters; and
 a processor configured to determine a position of the object on the surface from light blocked by the opaque part and to determine an orientation of the object by using detected light passing through the transparent part of the object.

7. The system according to claim 6, wherein the transparent part of the object is a passage, passing light only in a certain direction and the processor is configured to determine the orientation of the object by using detected light passing through the passage in a shadow caused by the opaque part.

8. The system of claim 6, wherein the processor is configured to determine the orientation of the object by using the detected light passing through the transparent part of the object in a first direction and provided by a first light emitter of the light emitters and detected by a first set of the light detectors, and to detect a further orientation of the object by using the detected light passing through the transparent part of the object in a second direction and provided by a second light emitter of the light emitters and detected by a second set of the light detectors.

9. A method for use in a system comprising light emitters and light detectors arranged around a periphery of a surface and at least an object placed on said surface, the object comprising at least a first part with optical properties of a first type and a second part with optical properties of a second type different from the first type for the light emitted by the light emitters, the method comprising the acts of:
 emitting light by a first light emitter of the light emitters when the object is in a first orientation and a position on the surface;
 detecting by a first set of the light detectors reflected light reflected by the second part of the object in a first direction in response to the emitting act; and
 determining the first orientation and the position of the object on the surface in response to the detecting act;
 further emitting light by the first light emitter when the object is in a second orientation and the position on the surface;
 further detecting by a second set of the light detectors reflected light reflected by the second part of the object in a second direction in response to the further emitting act; and
 determining the second orientation and the position of the object on the surface in response to the further detecting act.

* * * * *